United States Patent [19]

Maurer

[11] 4,278,698

[45] Jul. 14, 1981

[54] METHOD OF COOLING COOKED PRODUCTS BY INTERVAL SHOWERING

[76] Inventor: Rudolf Maurer, 7752 Insel Reichenau in Bodensee, Fed. Rep. of Germany

[21] Appl. No.: 14,308

[22] Filed: Feb. 23, 1979
(Under 37 CFR 1.47)

[51] Int. Cl.$^3$ ............................................... A23L 1/00
[52] U.S. Cl. ...................................... 426/506; 62/65; 99/355; 426/524
[58] Field of Search ............... 426/524, 523, 506, 641; 99/355; 62/65, 64; 134/18; 239/70, 99

[56] References Cited

U.S. PATENT DOCUMENTS

| | | | |
|---|---|---|---|
| 3,055,760 | 9/1962 | Morrison | 426/524 |
| 3,672,908 | 6/1972 | Hice, Sr. | 426/523 |
| 4,042,717 | 8/1977 | Gayte | 426/524 |

*Primary Examiner*—S. Leon Bashore
*Assistant Examiner*—Michael Goldman
*Attorney, Agent, or Firm*—Darby & Darby

[57] ABSTRACT

A cooked product is coolant by interval or intermittent showering with coolant in a process which can be completely automated. The product is cooled with a cold shower for a specified period of time, after which the shower is turned off for a time sufficient for heat to be transmitted from the core of the product to its outer surface so that the surface is heated and dried. This on/off cycle of the shower is repeated until, by successive extractions of heat from the product surface, the desired internal temperature of the product is reached. In comparison with continuous showering, this method permits equivalent cooling with substantially less than half the quantity of coolant and in a shorter time, all because of more efficient use of the coolant.

5 Claims, No Drawings

METHOD OF COOLING COOKED PRODUCTS BY INTERVAL SHOWERING

This invention relates generally to cooling of heated products and, more particularly, concerns a showering system and method for cooling cooked food products, such as meats.

In producing certain processed meat products, such as frankfurters, sausages, cold cuts an certain solid meat items, it is the conventional practice to cook the product and then to cool it rapidly by showering, so that heat is uniformly extracted from its surface. Typically, the product is continuously showered with cold water until its internal temperature is reduced to the range of 85° to 95° F, the specific temperature depending upon the type and size of product. This rapid cooling is intended to avoid product spoilage due to latent internal heat, to eliminate wrinkling of the product and its casing resulting from uneven, uncontrolled slow cooling, and to wash off unabsorbed smoke residue and other products such as salts and oils that leak out of the product during processing.

There are a number of drawbacks inherent in the conventional showering system. First of all, the use of cold water tends to cool the surface of the product too rapidly in comparison with its interior, so that the product takes on a deformed appearance. Of course, the water could be warmed slightly prior to showering, but this requires the use of energy for heating and is, therefore, inefficient and undesirable. Secondly, the conventional showering system makes very inefficient use of water, which is the coolant. Owing to the much more rapid conduction of heat through the water than through the product, the surface of the product is cooled almost immediately to the temperature of the water and, thereafter, the water removes heat from the product at the relatively slow rate that heat is transmitted from the core of the product to its surface. An additional shortcoming of the conventional showering method is that the relatively large temperature difference between the surface of the product and its core increases the possibility of surface fractures, particularly with a product having a skin, such as bologna or frankfurters.

Broadly, its is an object of the present invention to overcome the disadvantages of prior methods of cooling cooked products. Specifically, it is contemplated that the product be cooled by a method which avoids excessively rapid surface cooling in comparison with the core of the product.

It is another object of the present invention to cool a cooked product in a manner that makes more efficient use of the coolant than conventional showering systems, so that less of the coolant is consumed, while possible more rapid cooling.

It is yet another object of the present invention to cool a cooked product in a manner which will avoid an excessive temperature difference between the surface of the product and its core, thereby reducing the possibility of surface fractures.

It is also an object of the present invention to cool cooked products by a method that can be readily utilized in existing showering systems with a minimum of modification.

In accordance with the present invention, a cooked product is cooled by interval or intermittent showering with coolant in a process which can be completely automated. The product is cooled with a cold shower for a specified period of time, after which the shower is turned off and heat is transmitted from the core of the product to heat its surface. This on/off cycle of the shower is repeated until, by successive, extractions of heat from the product surface, the desired internal temperature of the product is reached. In comparison with continuous showering, this method permits equivalent cooling with substantially less than half the quantity of coolant and in a shorter time, all because of more efficient use of the coolant.

It has been found that two factors contribute to the efficiency of the interval showering method. First of all, during the inactive interval when the shower is off, heat transmitted from the core of the product evaporates the film of coolant water which is left on the surface of the product. This is a particularly efficient method of extracting heat from the core of the product, since a given quantity of water will absorb nearly one thousand times as much energy in evaporation as compared to being heated by 1° F. As a result of the evaporation during each cycle of showering, which is not available when showering continuously, the total time required to achieve a given degree of product cooling is reduced. For example, should the interval showering method be utilized with equal active and inactive shower intervals, substantially less than half the quantity of water will be utilized as compared with continuous showering, because the product is cooled to a given temperature in a shorter time.

The second factor contributing to the efficiency of the interval showering method is the relatively fast rate of heat conduction through water as compared to the conduction of heat through the product to be cooled. This permits the inactive interval of the shower to be made substantially longer than the active interval, thereby permitting a reduction in the amount of coolant consumed.

In typical systems used to cool cooked meat products, a quantity of products are mounted on a carriage which is placed in a water showering enclosure. Typically, the product is showered with approximately 20 gallons of water per minute. Product cooling times vary widely with the size, composition and structure of the product, the initial core temperature, the desired core temperature after cooling and temperature of the shower water. It has been found that a meat product with a four-inch diameter and a skin, such as bologna, which has an initial core temperature of 155° F. can be cooled to a core temperature of 95° F. by continuously showering for half an hour with cold water from a conventional public supply. Utilizing interval showering with equal active and inactive shower intervals, the same product can be cooled by the same amount in approximately 25 minutes. This will consume approximately 250 gallons of water (compare this with the 600 gallons required for conventional, continuous showering). The consumption of water can be reduced even further by increasing the inactive interval of the shower with respect to its active interval. For example, if the shower is kept off 6% of the time, water consumption can be reduced to 200 gallons.

An additional advantage of the interval showering method is that the off period of the shower allows a tempering effect to occur within the product. Inasmuch as core and surface temperatures tend to remain substantially closer on the average, surface fractures and other imperfections are eliminated.

It will be appreciated that interval showering is readily utilized in existing showering systems by incorporating conventional timers to control the active interval and inactive interval of the shower. Optimum active and inactive intervals for a product of a particular size, composition and construction can be achieved by maximizing the number of on/off cycles of the shower, with the purpose of maximizing the number of evaporations, and maximizing the duration of the inactive interval with respect to the active interval. However, the active interval should be long enough to permit substantial initial cooling of the product surface, by conduction during each active interval.

It will be appreciated by those skilled in the art that many modifications to the interval showering method are possible without departing from the scope and spirit of the invention as defined in the accompanying claims. For example, liquids other than water may be used as a coolant. However, water is preferred because of its good heat absorbing characteristics and its general availability.

What is claimed is:

1. A method for cooling and conditioning a cooked product with the aid of a shower providing coolant, said product being initially at a substantially higher temperature than the coolant and being cooled to achieve a predetermined final temperature of its core, said method comprising the steps of:

turning on said shower for a predetermined active time interval calculated to cool the surface of the product by a predetermined amount and to withdraw insufficient heat from said product to reduce its core from said initial to said final temperature during a single active time interval;

turning off the shower for a sufficient inactive time interval to permit the surface of the product to dry and to be raised in temperature by heat transmitted from the core of the product, and sequentially repeating the preceding steps for a number of repetitions calculated to reduce the core of the product to said predetermined final temperature.

2. The method of claim 1 wherein said coolant is a liquid which conducts heat at a substantially faster rate than said product, the surface of said product being cooled substantially to the temperature of the coolant during each active interval thereof.

3. The method of claim 2 wherein said coolant is cold water from a conventional supply.

4. The method of claim 1 wherein said active interval is shorter than said inactive interval.

5. The method of claim 4 wherein said active interval occupies at least 60% of the combined times of the active and inactive intervals.

* * * * *